United States Patent
Kuntze et al.

(10) Patent No.: US 6,681,256 B1
(45) Date of Patent: Jan. 20, 2004

(54) METHOD FOR DYNAMICALLY SELECTING ALLOCATION OF RANDOM ACCESS CHANNELS IN A COMMUNICATION SYSTEM

(75) Inventors: Roland Kuntze, Aachen (DE); Jari Jokela, Ylöjärvi (FI); Fujio Watanabe, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/470,323

(22) Filed: Dec. 21, 1999

(51) Int. Cl.$^7$ .............................................. G06F 15/16
(52) U.S. Cl. ........................ 709/236; 455/464; 370/280; 709/226
(58) Field of Search ................................ 709/236, 227, 709/235; 340/825.01, 825.02, 825.03, 825.04; 370/264, 280, 915, 329, 337, 336; 455/450, 464, 224

(56) References Cited

U.S. PATENT DOCUMENTS

| | | | |
|---|---|---|---|
| 5,231,634 A | | 7/1993 | Giles et al. ................ 370/95.1 |
| 5,276,911 A | * | 1/1994 | Levine et al. ................ 455/510 |
| 5,677,909 A | | 10/1997 | Heide .......................... 370/347 |
| 5,828,662 A | * | 10/1998 | Jalali et al. ................. 370/335 |
| 6,229,807 B1 | * | 5/2001 | Bauchot et al. .......... 370/241.1 |
| 6,285,662 B1 | * | 9/2001 | Watanabe et al. ........... 370/280 |

FOREIGN PATENT DOCUMENTS

| | | |
|---|---|---|
| EP | 0 621 708 A2 | 10/1994 |
| WO | WO96/03823 | 2/1996 |
| WO | WO98/12829 | 3/1998 |
| WO | WO98/54858 | 12/1998 |

OTHER PUBLICATIONS

Johnson, Martin, Hiperlan/2–The Broadband Radio Transmission Technology Operating in the 5 Ghz Frequency Band. Version 1.0, Copyright 1999.*

Hannikainen, Marko. TUTMAC: A Medium Access Control Protocol for a New Multimedia Wireless Area Network. 0–7803–4872. Sep. 1998. IEEE, pp. 592–596.*

Chaun, M., Access Priority Schemes in UMTS MAC. 0–7803–5668–3/99. 1999 IEEE, pp. 781–786.*

Lee, Sungwon, The Design and Performance Evaluation of High–Speed Packet Data MAC Protocol for CMDA Based IMT2000. Global Telecommunications Conference–Globel-Com '99. pp. 2694–2698.*

Johnsson, Martin. Hiperlan/2–The Broadband Radio Transmission Technology Operating in the 5 Ghz Frequency Band. Version 1.0 1999.*

Hannikainen, Marko. TUTMAC: A Medium Access Control Protocol for a New Multimedia Wireless Area Network 0–7803–4872. Sep. 1998. IEEE.pp. 592–596.*

Lee, Sungwon. The Design and Performance of High–Speed Packet Data MAC Protocol for CMDA Based IMT2000. Global Telecommunications Conference–GlobeCom '99.pp. 2694–2698.*

Chauh, M., Access Priority Schemes in UMTS MAC 0.7803–5668–3/99. 1999 IEEE. pp. 781–786.*

Georganopoulos, Nikolaos.MAC Scheduler Using Polling with Priorities for Future Wireless Multimedia Networks 0–7803–5796–5/99. 1999 IEEE.pp. 2658–2662.*

Wirbel, Loring. EETimes. HiperLan2 makes its official debut. Sep. 8, 1999.*

* cited by examiner

*Primary Examiner*—Zarni Maung
*Assistant Examiner*—William C. Vaughn, Jr.

(57) ABSTRACT

Apparatus, and an associated method, by which to select the number of random access channels to form a portion of a frame in a frame-formatted communication system. The number of random access channels allocated to form a portion of a frame is made responsive to quantitative determination of the likely need to communicate thereupon during the frame. In one implementation, selection is made of the number of random access channels to form portions of a frame defined in a HIPERLAN/2 system.

21 Claims, 2 Drawing Sheets

METHOD FOR DYNAMICALLY SELECTING ALLOCATION OF RANDOM ACCESS CHANNELS IN A COMMUNICATION SYSTEM

The present invention relates generally to channel allocation in a frame-formatted, time-division, communication system, such as a radio LAN (local area network) operable to the proposed HYPERLAN/2 standard. More particularly, the present invention relates to apparatus, and an associated method, by which to allocate radio channels in a frame defined in the communication system. Allocations are made dynamically, e.g., on a frame-by-frame basis, responsive to determinations of anticipated need to communicate upon the random access channels during the frame.

BACKGROUND OF THE INVENTION

A communication system is operable to communicate information between a sending station and a receiving station by way of communication channel. A radio communication system is a communication system in which the communication channel by which information is communicated between the sending and receiving stations is formed upon a portion of the electromagnetic spectrum. Such a communication channel is sometimes referred to as a radio channel. Because a radio channel does not require a wireline connection for its formation, a radio communication system inherently permits an increase in communication mobility relative to communication systems which require wired connections to form a communication channel.

Bandwidth limitations, which limit the communication capacity of many types of communication systems, are particularly limiting in many radio communication systems. Such bandwidth limitations in a radio communication system are typically due to limitations on the amount of the electromagnetic spectrum allocable to the radio communication system. Such bandwidth limitation limits the increase of communication capacity of a radio communication system. As a result, sometimes, the only manner by which to increase the communication capacity of the system is to increase the efficiency by which the allocated spectrum is utilized. Other types of communication systems similarly can exhibit a communication capacity increase as a result of increase in the efficiency by which the communication channels formed between sending and receiving stations of such systems are utilized.

Digital communication techniques, for instance, provide a manner by which to increase the efficiency by which to effectuate communications upon communication channels of a communication system. Implementation of digital communication techniques in a radio communication system is particularly advantageous due to the particular need to efficiently utilize the spectrum allocated to such a system.

Information which is to be communicated in a communication system which utilizes digital communication techniques is typically digitized into discrete, digital bits. Groups of the digital bits are sometimes formatted into packets, referred to as data packets. The data packets are communicated by the sending station, either individually or in groups, at discrete intervals to a receiving station. Once received at the receiving station, the packets of data are concatenated together to recreate the informational content contained therein.

Because packets of data can be communicated at discrete intervals, the communication channel upon which the packet is transmitted need not be dedicated to a single sending-receiving station pair. Instead, a shared communication channel can be used to communicate packets of data communicated between a plurality of sending-receiving station pairs. Because of the shared nature of the shared channel, improved communication capacity is possible.

Packet data communications are effectuated, for instance, in conventional LANs (local area networks). Wireless local area networks, operable in manners analogous to wired LANs, have also been developed and are utilized to communicate packets of data over a radio link. A HIgh PErformance Radio Local Area Network type 2 (HIPERLAN/2) standard promulgated by the ETSI BRAN (broadband radio access network) project sets forth a standard of operation of an exemplary wireless LAN. Mobile terminals operable therein transmit packet data upon a radio link to an access point of the infrastructure of the wireless LAN.

A frame structure is defined in the HIPERLAN-2 standard at a MAC (medium access control) layer defined therein. The MAC-frame includes four portions, a broadcast phase (BC), a downlink (DL) phase, an uplink (UL) phase, and a random access (RA) phase. Data communicated during the broadcast phase of the frame generally pertains to control information. The downlink and uplink phases carry user data and control data to, and from, a mobile terminal according to a reservation-based scheme. And, the random access phase permits random access by mobile terminals to random access channels defined therein. In contrast to the downlink and uplink phases, a reservation-based scheme is not utilized in the random access phase of the MAC-frame. The length of the MAC-frame is fixed to be of a 2 ms duration, but the length of each phase of the frame is selectable.

While communication of data upon a random access channel of the random access phase provides a simple manner by which to effectuate communication of data, lack of coordination between separate sending stations of separate sending-receiving station pairs might result in collisions of data if communicated concurrently upon the same random access channel. That is to say, separate sending stations might attempt to transmit separate packets of data during overlapping time periods. Typically, when a collision condition occurs, the packets of data interferes with one another to an extent to prevent the recreation of their informational content subsequent to reception at their respective receiving stations.

To reduce the likelihood of occurrence of collisions between packets of data transmitted upon the random access channels beneath a threshold, an adequate number of random access channels is required to be allocated to form a portion of the MAC-frame. By increasing the number of random access channels of which a MAC-frame is formed, the likelihood of a collision occurring upon any particular random access channel is reduced. However, by increasing the number of random access channels, the efficiency of channel utilization is reduced, particularly because the MAC-frame is of a fixed length.

Existing manners, and proposed manners, by which to select the number of random access channels to form a portion of a MAC-frame generally do not provide a quantitative manner by which to select the number of random access channels of which to form the random access portion of a MAC-frame. That is to say, presently, there generally is no manner by which to quantitatively balance the competing goals of minimizing the likelihood of the occurrence of a collision and the goal of maximizing communication capacity in the communication system.

A manner by which to allocate the number of random access channels to form a portion of a frame on a quantitative basis would therefore be advantageous.

It is in light of this background material related to communications in a frame-formatted communication system that the significant improvements of the present invention have evolved.

SUMMARY OF THE INVENTION

The present invention, accordingly, advantageously provides apparatus, and an associated method, by which to allocate random access channels in a frame-formatted communication system.

Quantitative determinations are made of anticipated communications upon random access channels during the frame. Determinations are made dynamically, such as on a frame-by-frame basis. When a determination is made of an increased need to communicate upon random access channels, increased numbers of random access channels are allocated to form a portion of the frame. And, conversely, if a determination is made that lessened numbers of random access channels are anticipated to be needed to effectuate communications, the frame is formed of lessened numbers of random access channels.

In one implementation, an embodiment of the present invention is operable to form a portion of wireless LAN (local area network), such as that set forth in the HIPERLAN/2 (high performance local area network/type 2) standard. In such a wireless LAN, a plurality of mobile terminals are operable to communicate by way of a wireless link with an access point when positioned within a coverage area defined by the access point. A typical wireless LAN also includes a plurality of access points, each defining a coverage area and between which communication handovers are effectuable as a mobile terminal travels between coverage areas defined by successive ones of the access points.

Frame-formatted communications are defined in the HIPERLAN/2, as well as other, standards. In particular, the HIPERLAN/2 standard defines a MAC (medium access control)-frame structure containing a variable number of random access channels. The random access channels provide random access to mobile terminals to send messages to the network infrastructure of the LAN to request the allocation of dedicated communication channels to effectuate communications thereon. Operation of an embodiment of the present invention determines how many random access channels are required to be needed during a frame to ensure that the likelihood of the occurrence of the collision upon a random access channel is less than a selected threshold.

In one aspect of the present invention, determinations are made as to the number of mobile terminals which are associated with an access point. These determinations are made, for instance, responsive to registration messages sent at selected intervals by mobile terminals. Registration messages are sent by the mobile terminals also during their initial powering-on. And, determination of the number of mobile terminals associated with an access point is also responsive to detection of indications of handovers of communications from another access point. Responsive to such determinations of the mobile terminals associated with an access point, selection is made of the number of random access channels to form a portion of a frame.

In another aspect of the present invention, determinations are made both of the number of mobile terminals associated with an access point but also of the number of such associated mobile terminals to which channel allocations have been reserved. A difference is formed between the number of mobile terminals associated with the access point and the number of mobile terminals which further already have a channel assignment allocated thereto. Selection of the number of random access channels to allocate to form a portion of the frame is made responsive to such difference. At least one random access channel is assigned to each frame even if all of the mobile terminals associated with the access point also have allocated thereto a channel allocation. Thereby, if a mobile terminal, previously unassociated with the access point, becomes associated with the access point during the time period of the frame, a random access channel is available thereto upon which to transmit a message thereon by the additional mobile terminal.

In another aspect of the present invention, determination is also made as to the communication-service type anticipated to be communicated during the frame. The communication-service type has associated therewith a priority level. Certain communication-service types are more time-sensitive than others. If the anticipated levels of communication of a communication-service type of a high priority level is small, the number of random access channels determined to be necessary is selected to be correspondingly large. If, conversely, the amount of communications of the communication-service type of a high priority level is relatively large, the number of random access channels should be fairly small. Selection of the number of random access channels of which to form a portion of the frame is made responsive thereto.

In another aspect of the present invention, the access point is further capable of selectably generating a wake-up indicator during the frame. A determination is made as to whether the access point is to generate a wake-up indicator during the frame. Selection of the number of random access channels of which to form a portion of the frame is made responsive to such determinations. If determination is made that the access point is to send a wake-up indicator during the frame, selection is made to increase the number of random access channels of which to form a portion of the frame.

Because quantitative determinations are made of anticipated communication conditions during the frame, allocation of the number of random access channels most appropriate to form a portion of the frame is better made. As a result, a better balance is able to be made between increasing the number of random access channels to minimize the likelihood of collision conditions thereupon, and most efficiently utilizing the communication capacity of the allocated spectrum to the communication system.

In these and other aspects, therefore, apparatus, and an associated method, is provided for selecting a selected number of random access channels of which to form a portion of a frame. The frame is defined in a multi-user communication system in which at least one sending station is capable of random access to a selected number of random access channels to Ocommunicate data to a receiving station. The selected number of random access channels form a portion of a frame of communication channels. A determiner is coupled to receive indications of a parameter indicative of anticipated communications between the at least one sending station and the receiving station. The determiner determines a number of random access channels needed to maintain a collision possibility of collisions between data communicated by the at least one sending station upon a random access channel of the frame beneath a threshold. A selector is operable responsive to determination made by the determiner. The selector selects how many random access channels are to form the portion of the frame.

A more complete appreciation of the present invention and the scope thereof can be obtained from the accompanying drawings, which are briefly summarized below, the following detailed description of the presently-preferred embodiments of the invention, and the appended claims.

DETAILED DESCRIPTION OF THE PREFERRED EMBODIMENT

Figure 1:
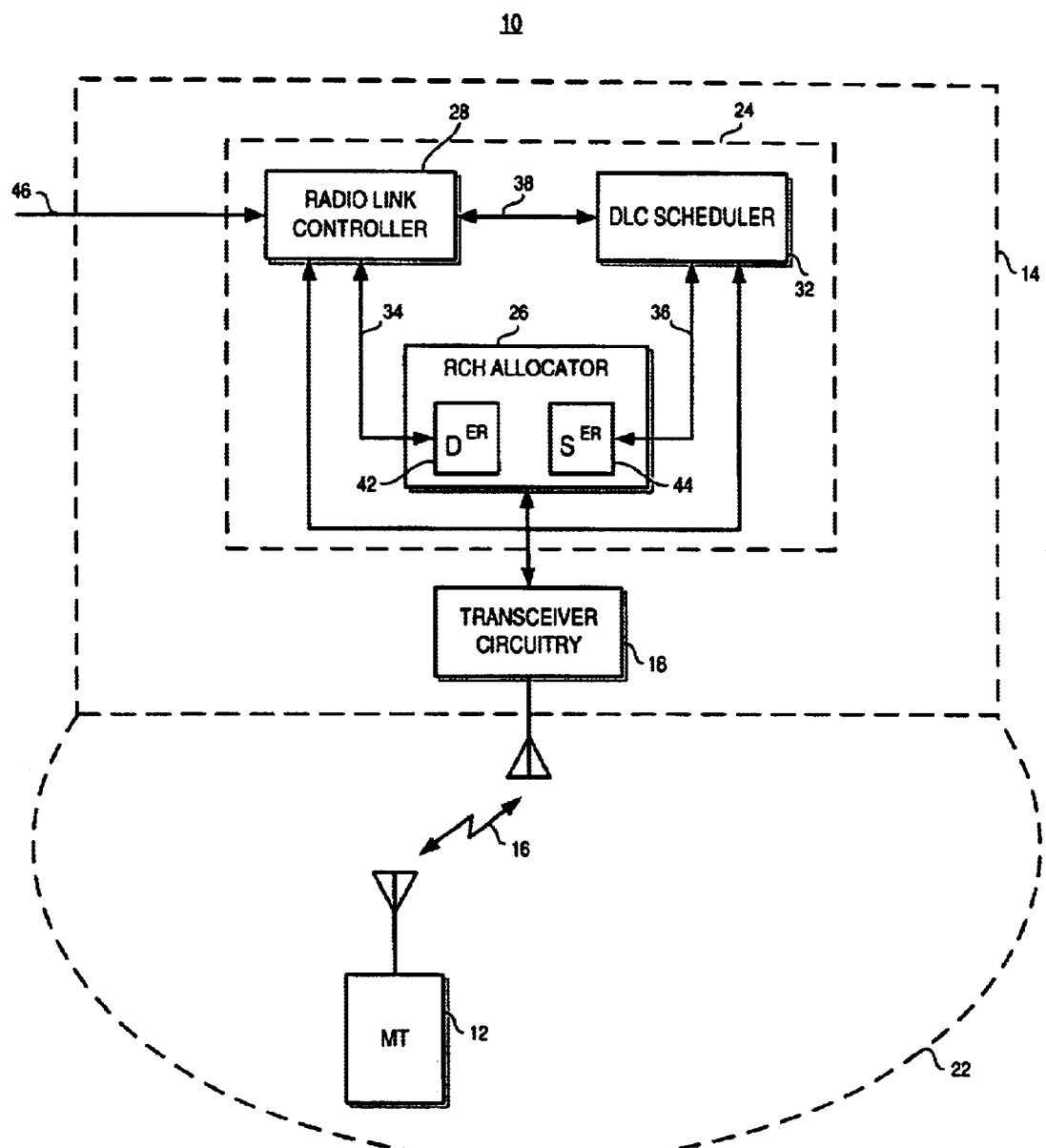
FIG. 1 illustrates a functional block diagram of the communication system in which an embodiment of the present invention is operable.

Referring first to FIG. 1, a communication system, shown generally at 10, provides for the communication of packet data between a mobile terminal 12 and an access point 14 by way of a radio link 16. The communication system 10 is a multi-user communication system permitting a plurality of mobile terminals 12 to communicate packet data with the access point 14, such as pursuant to a plurality of different communication sessions. While only a single mobile terminal 12 is shown in the figure, in an actual communication system, a plurality of such mobile terminals are operable to communicate packet data with the access point.

In the exemplary implementation, the communication system 10 is constructed to correspond to the specifications set forth in the HIPERLAN/2 (high performance local area network/type 2) standard, promulgated by the ETSI. In such a communication system, frame-formatted data is communicated during selected time slots within a MAC (medium access control)-frame which includes one or more random access channels (RACH). The number of random access channels included to form a portion of the frame is selectable.

During operation of an embodiment of the present invention, the number of random access channels of which the frame is formed is selected in a manner to balance the competing needs of maximizing communication capacity while also minimizing collision conditions upon a random access channel. In other implementations, an embodiment of the present invention is also operable to permit the selection of the number of random access, or other, channels of which to form a portion of the frame. The mobile terminal 12 is, accordingly, also representative of a sending station, and the access point 14 is representative of a receiving station, which are connected theretogether by way of a random access channel and upon which the sending station sends a message to the receiving station.

When, and as described herein, the communication system comprises a wireless LAN as defined in the HIPERLAN/2 standard, separate access points 14 are installed at separate locations of the geographic area in which the LAN is installed. For instance, separate access points are positioned at different floors of a building structure or in separate locations of a single floor of the building structure. Each access point includes transceiver circuitry 18 capable of two-way communication of packets of data. That is to say, the MAC-frame defined in the communication system includes both an uplink and a downlink phase permitting transmission by the mobile terminal 12 of packets of data upon an uplink channel to the transceiver circuitry and to permit packets of data generated at the transceiver circuitry 18 to be transmitted upon a downlink channel to the mobile terminal. The MAC-frame also includes a broadcast phase upon which data is broadcast by the transceiver circuitry of the access point to mobile terminals positioned within a coverage area, here shown at 22, defined by the access point.

The access point 14 is here further shown to include a controller 24, here including functional elements. Namely, the controller is shown to include a random access channel allocator 26, a radio link controller 28, and a DLC (data link control) scheduler 32. The random access channel allocator is coupled to the radio link controller by way of the line 34, and the random access channel allocator is coupled to the DLC scheduler by way of the line 36. And, the controller and scheduler are connected together by way of the line 38. The functional elements of the controller 34 are operable to allocate, within a frame, the number of random access channels which form a portion of the frame. Each of the functional elements of the controller are coupled to the transceiver circuitry of the access point.

During operation of the communication system, a user of the mobile terminal 12 might want to initiate communications therethrough. That is to say, a user of the mobile terminal might initiate a call. One of the first steps in the initiation of the call is a generation of a request by the mobile terminal for the allocation by the system of resources to the mobile terminal to effectuate a selected communication service. The resource request is generated upon a random access channel for communication to the access point 14 and subsequent action thereon. The request for resources generated upon a random access channel is susceptible to collision with other messages generated upon the same channel, to which there is random access.

When, and if, the request for resources is received at the access point, an appropriate allocation of channel resources are provided to effectuate the requested communication service.

As many mobile terminals might be positioned within the coverage area 22 of the access point, any of the mobile terminals is capable of generating a request for resources upon a random access channel to which random access is permitted. Operation of the functional elements of the controller 24 selects the number of random access channels allocated to a frame to ensure better that the likelihood of the occurrence of a collision condition upon a random access channel is beneath a threshold.

The random access channel allocator 26 is further shown, therefore, to include a determiner 42 and a selector 44 coupled thereto. The determiner is coupled, by way of the line 34, to the radio link controller 28 and, by way of the line 36, to the DLC scheduler 32. It should be noted that the determiner, selector 44, and also the allocator 26 are functional entities. Such entities can also form portions of the radio link controller 28 and the DLC scheduler 32.

The radio link controller 28 is here operable to perform the functions of radio link control set forth in the HIPERLAN/2 standard. The radio link controller is responsible for mobile terminal-access point association and disassociation, connection setup, and other aspects of control of the radio link 16. The radio link controller further is aware of which mobile terminal 12, and how many mobile terminals 12, are associated with the access point 14. And, such information is provided, by way of the line 34, to the determiner 42 of the random access channel allocator 26.

A mobile terminal becomes associated with the access point through the generation of a registration message, as noted above, or pursuant to a handover of communications from another access point to the access point 14. When a registration message is generated by a mobile terminal 12, the transceiver circuitry 18 detects such message and provides indications of the message, by way of the line 20, to the radio link controller. The line 46 represents signals generated by network infrastructure of the communication system during a handover of communications, and through such signals, the radio link controller is notified of the new association of a mobile terminal involved in the handover of communications, to the radio link controller. Indications of the number of mobile terminals associated with the access point 14 and provided to the random access channel allocator by way of the line 34 is made, in one implementation, responsive to a request for such information by the random access channel allocator.

The DLC scheduler 32, in the exemplary implementation, is also operable to perform the functions set forth in the HIPERLAN/2 standard. The DLC scheduler is operable, amongst other things, to distribute available bandwidth, i.e., channel resources, to individual mobile terminals responsive to resource requests generated by such mobile terminals. When a resource request is detected by the transceiver circuitry 18 of the access point, indications of such detection are provided to the DLC scheduler by way of the line 20.

In one embodiment of the present invention, the number of random access channels which are allocated to form a portion of a frame is proportional to the number of mobile terminals associated with the access point, here referred to as the number of "associated mobile terminals." The determiner determines the number of mobile terminals associated with the access point 14 responsive to indications of such number provided thereto by the radio link controller, and the selector 44 is operable to calculate the number of random access channels of which to include as a portion as a frame according to the following equation:

$$\# RCH = \alpha * (\# \text{ associated } MTs)$$

wherein:

$\alpha$ is a parameter of a value less than 1; and

"# associated MTs" is the number of associated mobile terminals, associated with the access point.

In another implementation, the DLC scheduler is operable to provide indications to the determiner of the number of mobile terminals to which resources have been allocated for the effectuation of communication services. Once resources are allocated for such communication, the mobile terminal would likely not utilize a random access channel. And, the selector 44 is operable to select the number of random access channels, # RCH, of which to allocate to form a portion of a frame according to the following equation:

$$\# RCH = \max [\beta \cdot (\# \text{ associated } MTs - \#MTs \text{ with uplink capacity}), 1]$$

wherein:

$\beta$ is a parameter of value less than 1;

"# associated MTs" is the number of mobile terminals associated with the access point; and "# MTs with uplink capacity" is the number of mobile terminals to which channel resources have already been allocated.

Analysis of this equation indicates that, if the number of mobile terminals to which channel resources are assigned in the frame is small compared with the number of associated mobile terminals, the number of random access channels allocated to the frame is relatively large. Conversely, if all, or a substantial portion, of the associated mobile terminals already have channel resources associated thereto, the number of random access channels allocated to the frame is relatively small, as low as one random access channel. A minimum number of random access channels, here one, permit newly-arrived mobile terminals within the coverage area 22 to become associated with the access point. The number of random access channels calculated as above-noted is rounded-off to form an integer value.

In a further embodiment, the determiner 42 is further provided with indications of the communication-service type of communication services to be effectuated during the frame. And, the selector 44 is operable, responsive to determination of the determiner, of the communication-service types of communication services to be effectuated, to select a number of random access channels of which to form a portion of the frame. If only a small amount of the communications to be effectuated during the frame are of a communication-service type to which a high priority level is associated, the number of random access channels selected by the selector to form a portion of the frame is fairly large, even though the transmission capacity of such random access channels could be used to communicate data with a low priority. Such selection is made for the reason that transmission delays of the requests for resources of newly-associated mobile terminals is of significance. Thus, mobile terminals which do not have uplink channel capacity resources already allocated thereto, but communication-services to which high priority is associated have a high probability of success when requesting, with a resource request, channel resources utilizing a random access channel.

In another embodiment, the access point 14 is operable to send, during selected frames, wake-up indicators at a first a portion of the frame to indicate whether the frame contains a wake-up message. A mobile terminal in a sleep mode must wake-up to listen to the contents of the frame if the first portion of the frame includes a wake-up indicator. If the frame does not contain a wake-up message for a particular mobile terminal, the mobile terminal is permitted to continue to remain in a sleeping mode. However, as the wake-up indicator is frequently utilized, it is useful for the mobile terminal in the sleeping mode to remain synchronized to the channel and the MAC-frame defined thereon. In such a situation, the selector reserves a large number of random access channels to form a portion of the MAC-frame which contains a wake-up indicator. Thereby, a mobile terminal is able to estimate the best opportunity for transmission in a random access channel, thereby reducing the possibility of collision conditions. In other words, a MAC-frame that includes a wake-up indicator must awaken the mobile terminal. Once awakened, the mobile terminal also checks internal buffers to see if a message is to be communicated by the mobile terminal. Therefore, during MAC-frames which include wake-up indicators, there is an increased likelihood that an increased number of mobile terminals shall check their respective buffers and determine that messages are to be transmitted therefrom.

Figure 2:
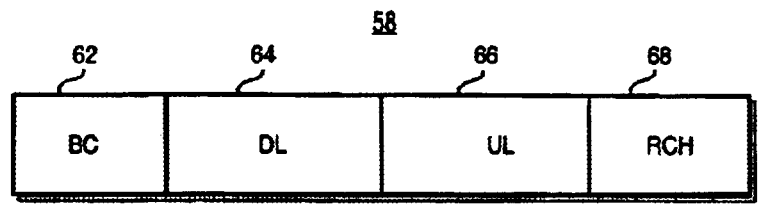
FIG. 2 illustrates the frame format of a MAC (medium access control) frame pursuant to which communications are formatted during operation of an exemplary implementation of the communication system shown in FIG. 1.

FIG. 2 illustrates a MAC-frame, shown generally at 58, as defined in the HIPERLAN/2 standard. The frame includes a broadcast (BC) phase portion 62, a downlink (DL) phase portion 64, an uplink (UL) phase portion 66, and a random access channel (RCH) portion 68. Operation of an embodiment of the present invention selects the number of random access channels of which to form the random access channel portion phase 68. Because quantitative determinations are made as to the likelihood of the need to utilize a random access channel, selection of the number of random access channels of which to form the MAC-frame is made upon a quantitative basis. Also, selection is dynamically made, on a frame-by-frame basis.

Figure 3:
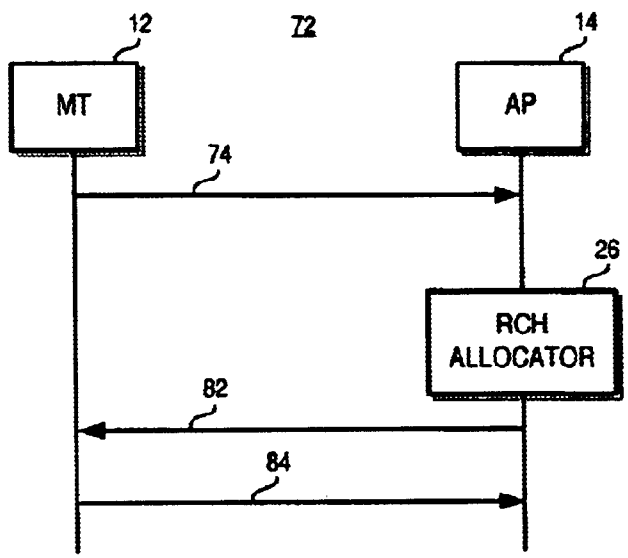
FIG. 3 illustrates a message sequence diagram showing the message sequencing generated during operation of an embodiment of the present invention.

FIG. 3 illustrates a message sequence diagram, shown generally at 72, which shows the sequencing of messages generated during operation of the communication system shown in FIG. 1. First, as indicated by the segment 74, messages are sent to an access point. The messages represented by the segment 74 are representative of registration messages sent by a mobile terminal to an access point. The segment 74 alternately could represent messages sent to the access point from elsewhere, such as from other locations of the network infrastructure to which the access point is coupled indicating handovers of communications to the access point. And, the message could also be representative of indications of communication-service types of communication services to be effectuated during a frame. Indications of such messages are provided to the random access channel allocator 26. The allocator 26 is operable to select the number of random access channels which are to form a portion of the frame. Indication of the channel formation are broadcast, here indicated by the segment 82, to the mobile terminals. Thereafter, and as indicated by the segment 84, random access messages are communicated upon the allocated random access channels.

Figure 4:
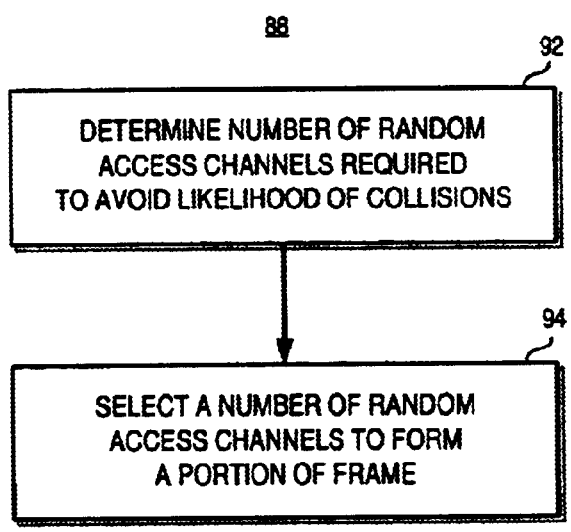
FIG. 4 illustrates a method flow diagram listing the method of operation of an embodiment of the present invention.

FIG. 4 illustrates a method, shown generally at 88, of an embodiment of the present invention. The method is operable to select a selected number of random access channels which form a portion of a frame defined in a frame-formatted communication system.

First, and as indicated by the block 92, the number of random access channels needed to maintain a collision possibility of collisions between data communicated by the at least one sending station upon a random access channel of the frame beneath a threshold is determined. Then, and as indicated by the block 92, selection is made of how many random access channels are to form the portion of the frame. Thereby, a quantitative manner is provided by which to allocate random access channels to form a portion of a frame.

These descriptions are of preferred examples for implementing the invention, and the scope of the invention should not necessarily be limited by this description. The scope of the present invention is defined by the following claims.

We claim:

1. In a multi-user, frame-formatted communication system in which fixed-length frames are defined, each frame having a random-access portion and a nonrandom access portion, the communication system having at least one mobile terminal that is capable of random access to a selected number of random access channels, defined within the random-access portion of each frame, to communicate data to an access point, an improvement of apparatus for selecting the selected number of the random access channels defined within the random-access portion, thereby to define, in part, how much of the frame is formed of the random-access portion, said apparatus comprising:

a determiner coupled to receive indications of a parameters indicative of anticipated communications between each of the at least one mobile terminal and the access point during the frame, said determiner for determining a number of random access channels needed to maintain a collision possibility of collisions between data communicated by the at least one mobile terminal upon a random access channel of the frame beneath a threshold; and a selector in the access point operable responsive to determination made by said determiner, said selector for selecting how many random access channels are defined within the random-access portion of the frame, selection made by said selector being determinative of how much of the frame is comprised of the random access portion and determinative, at least in part, of how much of the frame is comprised of the nonrandom access portion.

2. The apparatus of claim 1 wherein the indications of the parameter indicative of anticipated communication between each of the at least one mobile terminal and the access point which said determiner is coupled to receive comprise indications of how many of the at least one mobile terminal are associated with the access point.

3. The apparatus of claim 2 wherein the access point defines a coverage area and wherein each of the at least one mobile terminal is associated with the access point when the mobile terminal is positioned within the coverage area of the access point.

4. The apparatus of claim 3 wherein each of the at least one mobile terminal is operable to send a registration message, detection of the registration message at the access point indicating to the access point association of the mobile terminal from which the registration message is sent to the access point.

5. The apparatus of claim 4 wherein selections made by said selector of how many random access channels are to be defined within the random-access portion of the frame are proportional to how many mobile terminals are determined by said determiner to be associated with the access point.

6. The apparatus of claim 3 wherein the indications of the parameter indicative of the anticipated communications between the at least one mobile terminal and the access point further comprise indications of how many of the at least one mobile terminal associated with the access point are assigned to communicate during the nonrandom access portion of the frame.

7. The apparatus of claim 6 wherein selections made by said selector of how many random access channels are to be defined within the nonrandom access portion of the frame are proportional to a difference calculated of how many mobile terminals are determined to be associated with the access point less how many of the mobile terminals are assigned to communicate during the nonrandom access portion of the frame.

8. The apparatus of claim 7 wherein the selections made by selector select at least one random access channel to form a portion of the frame.

9. The apparatus of claim 1 wherein the indications of the parameter indicative of anticipated communications between the at least one mobile terminal and the access point that said determiner is coupled to receive comprise indications of a communication-service type of communications to be effectuated with each of the at least one mobile terminal.

10. The apparatus of claim 9 wherein said determiner further assigns a priority level to each communication-service type, of which indications thereof are reserved thereat.

11. The apparatus of claim 10 wherein selection made by said selector of how many random access channels are defined within the random-access portion of the frame is proportional to the priority level assigned to the communication-service type of the communications to be effectuated with the at least one mobile terminal.

12. The apparatus of claim 1 wherein the mobile terminal is operable in a sleep mode and in a nonsleep mode, wherein the access point is further selectably operable to send a wake-up indication during the frame and wherein the indications of the parameter indicative of anticipated communications between the at least one mobile terminal and the access point that said determiner is coupled to receive comprises an indication of whether the wake-up indication is to be sent during the frame.

13. The apparatus of claim 12 wherein selections made by said selector of how many random access channels are to form a portion of the frame is dependent, at least in part, upon whether a wake-up indication is to be sent during the frame.

14. The apparatus of claim 13 wherein a first number of random access channels is selected by said selector when the wake-up indication is to be sent during the frame and a second number of random access channels is selected by selector when a wake-up indication is not to be sent during the frame, the first number greater than the second number.

15. The apparatus of claim 1 wherein the multi-user communication system comprises a wireless LAN (local area network) wherein the access point comprises a portion of the network infrastructure of the wireless LAN, said determiner and said selector forming portions of the network infrastructure.

16. In a method for communicating in a multi-user, frame-formatted communication system in which fixed-length frames are defined, each frame having a random-access portion and a nonrandom access portion, the communication system having at least one mobile terminal that is capable of random access to a selective number of random access channels, defined within the random-access portion of each frame, to communicate data to an access point, an improvement of a method for selecting the selected number of the random access channels defined within the random-access portion, thereby to define how much of the frame is formed of the random-access portion of the frame, said method comprising:

determining a number of random access channels needed to maintain a collision possibility of collisions between data communicated by the at least one mobile terminal upon a random access channels of the frame beneath a threshold responsive to indications of parameters indicative of anticipated communications between each of the at least one mobile terminal and the access point; and selecting by the access point, responsive to determinations made during said operation of determining, how many random access channels are defined within the random-access portion of the frame, selection being determinative of what portion of the frame is comprised of the random access channels and determinative, at least in part, of how much of the frame is comprised of the nonrandom access portions.

17. The method of claim 16, further comprising the initial operation of generating indications of a parameter indicative of anticipated communications between the at least one mobile terminal and the access point.

18. The method of claim 17 wherein the indications generated during said operation of generating comprise indications of how many of the at least one mobile terminal are associated with the access point.

19. The method of claim 18 wherein the indications generated during said operation of generating further comprise indications of how many of the at least one mobile terminal associated with the access point are assigned to communicate during the nonrandom access portion of the frame.

20. The method of claim 17 wherein the indications generated during said operation of generating comprise indications of a communication-service type of communications to be effectuated with the at least one mobile terminal.

21. The method of claim 17 wherein the access point is further selectably operable to send a wake-up indication during the frame and wherein the indications generated during said operation of generating comprise an indication of whether the wake-up indication is to be sent during the frame.

* * * * *